United States Patent [19]
Roberts et al.

[11] Patent Number: 5,365,396
[45] Date of Patent: Nov. 15, 1994

[54] NEGATIVE SEQUENCE DIRECTIONAL ELEMENT FOR A RELAY USEFUL IN PROTECTING POWER TRANSMISSION LINES

[75] Inventors: Jeffrey B. Roberts, Moscow, Id.; Edmund O. Schweitzer, III, Pullman, Wash.

[73] Assignee: Schweitzer Engineering Laboratories, Inc., Pullman, Wash.

[21] Appl. No.: 83,454

[22] Filed: Jun. 28, 1993

Related U.S. Application Data

[63] Continuation-in-part of Ser. No. 961,260, Oct. 15, 1992.

[51] Int. Cl.$^5$ .............................................. H02H 3/26
[52] U.S. Cl. ................................... 361/80; 361/84
[58] Field of Search ............................. 361/42, 44–50, 361/54, 56, 57, 63–66, 76, 78–80, 82, 84, 85, 187, 188; 324/83 Q, 512, 522, 525

[56] References Cited

U.S. PATENT DOCUMENTS

| | | | |
|---|---|---|---|
| 4,352,137 | 9/1982 | Johns | 361/82 |
| 4,458,285 | 7/1984 | De Mesmaeker | 361/79 |
| 4,686,601 | 8/1987 | Alexander et al. | 361/80 |
| 4,825,327 | 4/1989 | Alexander et al. | 361/82 |

Primary Examiner—Jeffrey A. Gaffin
Assistant Examiner—Ronald W. Leja
Attorney, Agent, or Firm—Jensen & Puntigam

[57] ABSTRACT

A directional element measures the negative sequence voltage and the negative sequence current and from those quantities produces a scalar quantity related to the negative sequence impedance of a power transmission line relative to the location of the directional element. The magnitude of the negative sequence impedance is calculated from the magnitude of the negative sequence voltage and magnitude of the negative sequence current. The scalar quantity is then compared against two threshold quantity settings, one to determine a forward fault and the other to determine a reverse fault. The threshold quantity settings include, respectively, a selected fraction of preselected basic threshold values and a selected fraction of the magnitude of the negative sequence impedance. The scalar quantity must be less than the forward threshold quantity for a forward fault and greater than the reverse threshold quantity for a reverse fault.

5 Claims, 3 Drawing Sheets

NEGATIVE SEQUENCE DIRECTIONAL ELEMENT FOR A RELAY USEFUL IN PROTECTING POWER TRANSMISSION LINES

BACKGROUND OF THE INVENTION

This is a continuation-in-part of U.S. patent application Ser. No. 961,260, filed on Oct. 15, 1992, in the names of Jeffery B. Roberts and Edmund O. Schweitzer III.

TECHNICAL FIELD

This invention relates generally to directional elements used in protective relays for power transmission lines and more specifically concerns a negative sequence directional element.

In the identification of faults on a power transmission line by a protective relay which is located at a given point along the line, it is extremely important to be able to identify the direction of the fault on the transmission line relative to the location of the relay. The fault direction is either downstream of (in front of) the protective relay, which is referred to herein as a forward fault, or upstream of (in back of) the relay, which is referred to herein as a reverse fault. The ability of a protective relay to provide direction information for faults is referred to generally as its directional security. High directional security, meaning providing accurate directional information, is of great importance in the overall operational value of the relay.

Accurate directional information guarantees that the relay will never assert, i.e. provide a fault indication which results in the tripping of a circuit breaker, for faults in the reverse direction if the fault is located in the forward direction and vice versa. A relay which looks for faults in both directions will have either separate forward and reverse directional elements or a single element capable of providing information for both directions.

There are different types of directional elements, among the most popular being negative sequence polarized directional elements, and zero sequence polarized directional elements. Negative sequence directional elements are capable of declaring fault direction for all unbalanced faults. However, it is known that negative sequence elements, i.e. those elements using negative sequence quantities of voltage and current to make direction determinations, do have certain advantages over other approaches, including zero sequence elements. These advantages include insensitivity to zero sequence mutual coupling.

In the conventional negative sequence element technique, the phase angle of the negative sequence voltage is compared against the phase angle of the negative sequence current. If the negative sequence current leads the negative sequence voltage, regardless of the amount of the angular difference, then the fault is in the forward direction; otherwise it is in the reverse direction.

However, there are certain disadvantages to conventional negative sequence directional elements when the negative sequence source upstream of the relay is strong, such that the impedance is low. In this situation, the negative sequence voltage at the relay will be quite low, which in turn reduces the sensitivity of the relay. It is desirable that such relays be sufficiently sensitive that they operate both for close-in faults and for remote faults, as well as operating very fast (less than one cycle) in response to the occurrence of a fault. With a strong source, the negative sequence directional element may not produce reliable results for close-in and remote faults.

In order to increase the sensitivity of the conventional negative sequence directional element in such situations, a compensating boost to the negative sequence voltage is sometimes provided, which in turn makes the phase angle measurement for close-in and remote faults easier and more reliable. However, this compensating boost in turn creates a disadvantage in certain situations, because a significant boost could result in a reverse fault looking like a forward fault to the forward directional element, a very undesirable result. In addition, it is often difficult and/or time consuming for the operator/engineer to make a proper selection of the boost.

It would be most desirable for a directional relay to have separate forward and reverse direction sensitivities, individually selectable; however, this has not been accomplished heretofore with negative sequence directional elements.

Hence, there remains a need for a directional element which is secure but also sensitive to faults on the transmission line.

DISCLOSE OF THE INVENTION

Accordingly, the present invention is a directional element for use in a protective rely which includes means for obtaining negative sequence voltage and current quantities of the power signal present on a power transmission line; means for calculating from said negative sequence voltage and current quantities a directional quantity which is related to the negative sequence impedance of the transmission lines; and means for comparing said directional quantity against at least one comparison threshold quantity to identify at least one of a forward fault and a reverse fault on the transmission line relative to the relay, wherein said comparison threshold quantity includes at least a portion of a predetermined basic threshold quantity and a selected fraction of the magnitude of the negative sequence impedance determined from the magnitudes of said negative sequence voltage and current quantities.

BEST MODE FOR CARRYING OUT THE INVENTION

In conventional directional elements using negative sequence quantities, the torque (T) produced by forward faults is given by the following equation:

$$T = \mathrm{Re}[v_2 \cdot (Z_{L2} \cdot I_2)^*],$$

where * denotes the complex conjugate. Only negative sequence quantities are used. Only the real portion of the entire expression is used. The mathematical operator on the $Z_{L2}\cdot I_2$ expression is a complex conjugate, as indicated above. $V_2$ and $I_2$ are negative sequence voltage and current quantities, respectively, both of which are measured, and $Z_{L2}$ is the modeled negative sequence line impedance, which is known. In a compensated (boosted) negative sequence directional element, the boost provided to $V_2$ for low impedance strong sources is $\alpha \cdot Z_{L2} \cdot i_2$. The amount of compensation is determined by the value of the $\alpha$ constant selected. The compensated torque equation is thus T (Compensated) = Re $[(V_2 - \alpha \cdot Z_{L2} \cdot I_2) \cdot (Z_{L2} \cdot I_2)^*]$. Again, the quantity T is negative for forward faults and positive for reverse faults if the proper $\alpha$ constant is used. As indicated above, however, the compensated negative sequence torque T can in certain situations cause difficulties because an actual reverse fault can appear as a forward fault to the compensated directional element, i.e. when the expression $\alpha \cdot Z_{L2} \cdot I_2$ has a greater magnitude than $V_2$.

Figure 1:
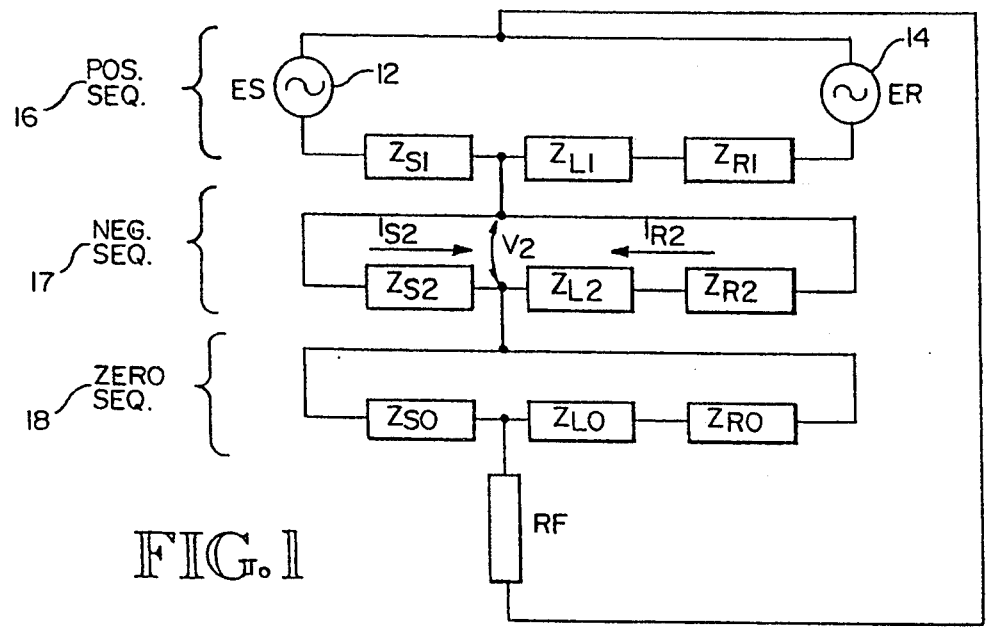
FIG. 1 is a sequence network diagram for a ground fault on a power transmission line with sources of fault current at both ends of the line.

Referring now to FIG. 1, a sequence network for a single line to ground fault is shown involving a near source 12 and a remote source 14. The positive sequence, negative sequence and zero sequence portions 16, 17 and 18, respectively, form the sequence network. In the above arrangement, the negative sequence current seen by the relay for forward faults is $I_{S2}$, and $-I_{R2}$ for reverse faults. The negative sequence impedance for forward faults is thus $$Z_2 = \frac{-V_2}{I_{S2}} = Z_{S2},$$

while for reverse faults, $$Z_2 = \frac{-V_2}{-I_{R2}} = (Z_{L2} + Z_{R2}).$$

The measured negative sequence impedance thus is different between forward faults and reverse faults, thus providing in effect a fault direction determination.

Figure 2:
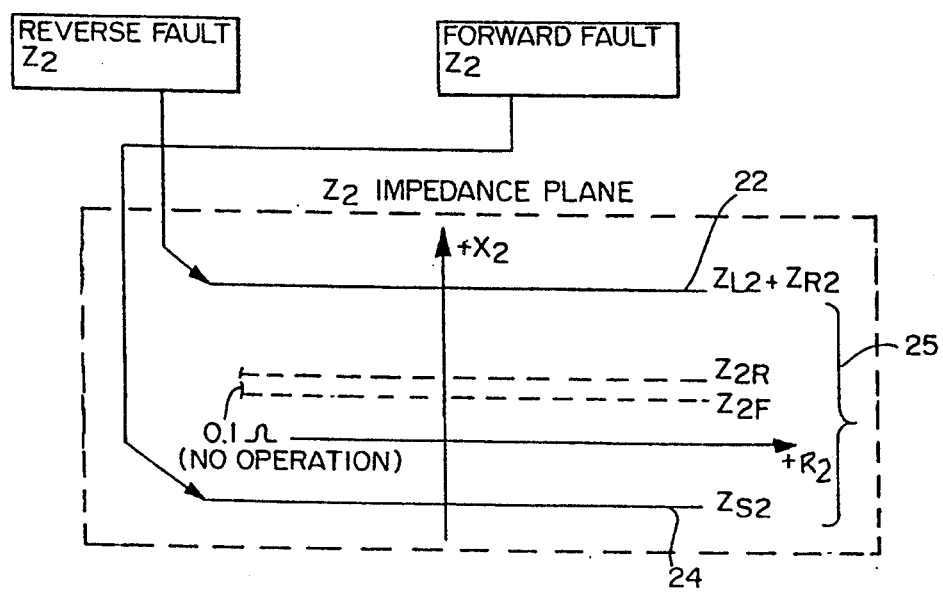
FIG. 2 is an impedance plane diagram showing the operation of the directional element of the present invention.

This is shown graphically in the impedance plane representation in FIG. 2, where line 22 is equal to $Z_{L2} + Z_{R2}$, while line 24 is equal to $Z_{S2}$. There is a significant gap 25 between them. Hence, a fault can be identified as forward of the relay if $Z_2$ is less than a first threshold setting, designated $Z_{2F}$ herein, which is in the gap 25, and reverse if it is greater than a second threshold setting, designated $Z_{2R}$ herein, which is also in gap 25, but greater than the first threshold setting. The first threshold setting $Z_{2F}$ is set less than the second threshold setting $Z_{2R}$ to avoid any overlap condition where $Z_2$ might satisfy both forward and reverse conditions, but not too far apart, which would result in a significant "no decision" area. Generally, the two thresholds are separated by at least 0.1 ohm.

Figure 3:
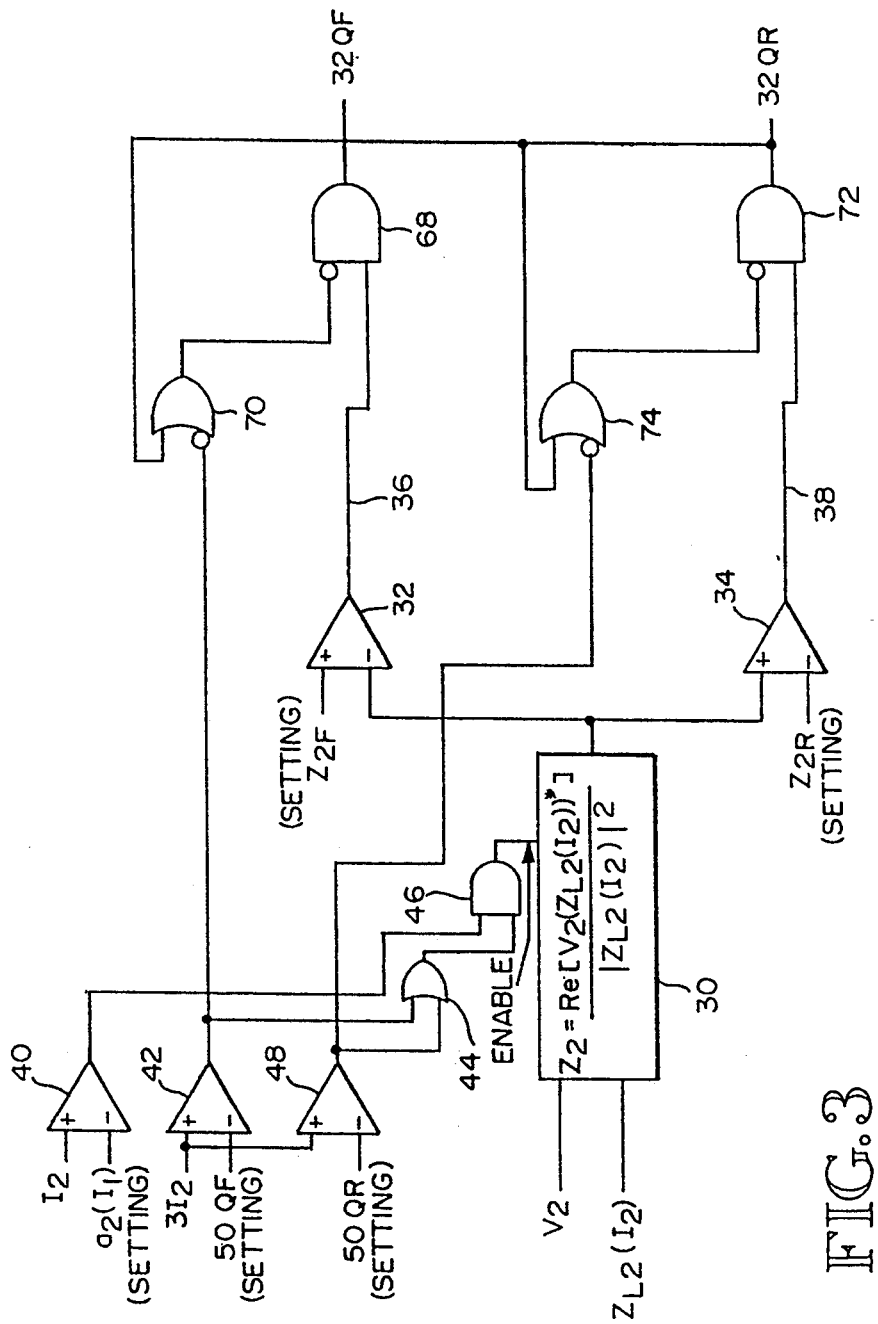
FIG. 3 is a diagram showing the directional element system of the present invention.

FIG. 3 shows a system for implementing the directional element approach outlined theoretically above. As discussed above, the approach of the present invention, instead of using voltage and current quantities and the phase angle difference therebetween for direction determination, is to use voltage and current quantities to determine negative sequence impedances or quantities representative of those impedances in the form of a scalar number, which may then be conveniently compared with threshold numbers to determine fault direction.

The embodiment described herein provides a scalar quantity related to impedance, but it should be understood that actual impedance values could be used as well. Referring now to FIG. 3, $V_2$ (negative sequence voltage) and the quantity $Z_{L2} \cdot (I_2)$ are applied as inputs to a calculation block 30. The $V_2$ and $I_2$ quantities ($I_2$ is the negative sequence current) are produced conventionally by measuring the analog voltage and current on the transmission line, low pass filtering the voltage and current, converting the resulting quantities to digital quantities, filtering the digital quantities, and then deriving the negative sequence components of those quantities. These are all common, well-known procedural steps. The $Z_{L2}$ quantity is the negative sequence component of the modeled line impedance, which is known, of the transmission line. The quantities $V_2$ and $Z_{L2 \cdot I2}$ are used to produce a scalar quantity $Z_2$, which is related to the negative sequence impedance $Z_2$.

The scalar quantity $z_2$ is derived as follows. As indicated above with respect to the conventional compensated negative sequence element, T (torque) = Re$[(V_2 - \alpha \cdot Z_{L2} \cdot I_2) \cdot (Z_{L2} \cdot I_2)^*]$. A so-called balance condition, in which neither a forward nor reverse direction indication is produced, requires a zero torque, i.e. Re$[(V_2 - \alpha \cdot Z_{L2} \cdot I_2) \cdot (Z_{L2} \cdot I_2)^*] = 0$. If $\alpha$ is $z_2$ (scalar) and $Z_{L2}$ is $1\angle \Theta$, where $\Theta$ is the angle of $Z_{L2}$, then for a zero torque (balanced) condition, Re$[V_{L2} - z_2 \angle \Theta \cdot I_2) \cdot (I_2 \cdot 1\angle \Theta^*)] = 0$, and $$z_2 = \frac{Re[V_2 \cdot (I_2 \cdot 1\angle \Theta)^*]}{Re[(I_2 \cdot 1\angle \Theta) \cdot (I_2 \cdot 1\angle \Theta)^*]} = \frac{Re[V_2 \cdot (I_2 \cdot 1\angle \Theta)^*]}{I_2^2}$$

This is equivalent to the calculation shown in FIG. 3. Since the term $(\alpha \cdot Z_{L2} \cdot I_2)$ increases the amount of $V_2$ for directional calculations, which is equivalent to increasing the magnitude of the negative sequence source behind the relay, increasing the forward $z_2$ to a threshold number has the same effect. Hence, if $z_2$ is less than the forward threshold, the fault is forward, while if $z_2$ is greater than the reverse threshold, the fault is reverse.

Referring again to FIG. 3, the scalar quantity $z_2$ from calculation block 30 is compared against threshold impedance settings $Z_{2F}$ and $Z_{2R}$, as shown by blocks 32 and 34. If the output from block 30 is less than $Z_{2F}$, then an output occurs on line 36 indicating a forward fault, while if the output from block 30 is greater than $Z_{2R}$, an output occurs on line 38, indicating a reverse fault.

The system of FIG. 3 also includes several security features. First, the negative sequence current $I_2$ is compared to the positive sequence current $I_1$ (multiplied by a scalar quantity $a_2$) by comparator 40. If $I_2$ is quite low, such as might occur where the positive and negative sequence networks have significant coupling relative to three-phase faults, computation block 30 is not enabled for $z_2$ calculations. Thus, there is no output of block 30. Typically $a_2$ is in the range of 0.02—0.5. The output of comparator 40 is applied to AND gate 46.

The other enable comparisons involve minimum values of $3I_2$. A 50QF element is a conventional fault detection element. It measures $3I_z$ and establishes a minimum value for current sensitivity in the forward direction. The preferred setting is above normal load unbalance and below the lowest expected negative sequence current for forward direction unbalanced (phase-phase, phase-phase-ground and single line to ground) faults. In the embodiment shown, 50QF has a setting range of 0.5 amps to 5 amps. The 50QF setting is compared against $3I_2$ in comparator 42 and the output applied to "OR" gate 44. The 50QR fault detector element measures $3I_2$ current and establishes a minimum value of current sensitivity in the reverse direction. The 50QR element preferably has a setting which is above normal load unbalance and below the lowest expected negative sequence current magnitude for reverse direction unbalanced faults, within the range of 0.5 amps to 5 amps. The 50QR setting is then compared with $3I_2$ by comparator 48 and the output applied to OR gate 44. If the output of either comparator 42 or 48 is high, the OR gate produces a high output to AND gate 46.

In summary, if the signal from comparator 40 is high and one of the signals from comparators 42 or 48 is high, calculating block 30 is enabled to produce the $z_2$ scalar quantity. The $z_2$ quantity is then, as indicated above, compared with the $Z_{2F}$ threshold in comparator 32, which establishes the minimum negative sequence source impedance behind the relay for a forward fault. $Z_{2F}$ typically will be 0, although where the local source is strong, $Z_{2F}$ is some positive number to assure a strong torque for remote single line to ground faults. However, $Z_{2F}$ must always be less than $Z_{L2} + Z_{R2}$. If $z_2$ is less than $Z_{2F}$, the output from comparator 32 goes high, indicating a forward fault.

The $z_2$ quantity is compared with the reverse threshold $Z_{2R}$ by comparator 34. $Z_{2R}$ sets the minimum negative sequence remote source plus line impedance for faults behind the relay. The minimum $Z_{2R}$ in the embodiment shown is $Z_{2F}$ plus 0.1 ohm. If the $z_2$ quantity is greater than $Z_{2R}$, then the output of comparator 34 is a high.

The circuit of FIG. 3 includes two additional security aspects. The output of forward threshold comparator 32 is applied to an AND gate 68, along with a "not" output line from OR gate 70. The output from reverse threshold comparator 34 is applied to an AND gate 72, along with a not output line from OR gate 74. The output of AND gate 72 is applied as an input to OR gate 70, along with a not line input from forward direction enable comparator 42, while the output of AND gate 68 is applied as one input to OR gate 74, along with a not line input from reverse direction comparator 48. Thus, when there is an output from AND gate 72, indicating a reverse fault, forward fault declarations are blocked; and where there is an output from AND gate 68, indicating a forward fault, reverse fault declarations are blocked. The outputs of AND gates 68 and 72 respectively, are referred to as 32QF and 32QR, the industry nomenclature for directional element outputs.

As indicated above, the negative sequence directional element of the present invention is used for unbalanced faults on a three-phase power line. Negative sequence current occurs when there is an unbalanced fault, but not for three-phase faults. Hence, there should not be an output from AND gates 68 or 72, indicating a forward or reverse fault, when the fault is three-phase. However, negative sequence filters are used in the implementation of the directional element circuit of the present invention, and it is possible that these filters will produce a transient output for three-phase faults. This transient output could, in turn, produce an undesired output from AND gate 68 or 72, depending on which filters produce the transient. This output would be an erroneous indication of a fault.

Figure 4:
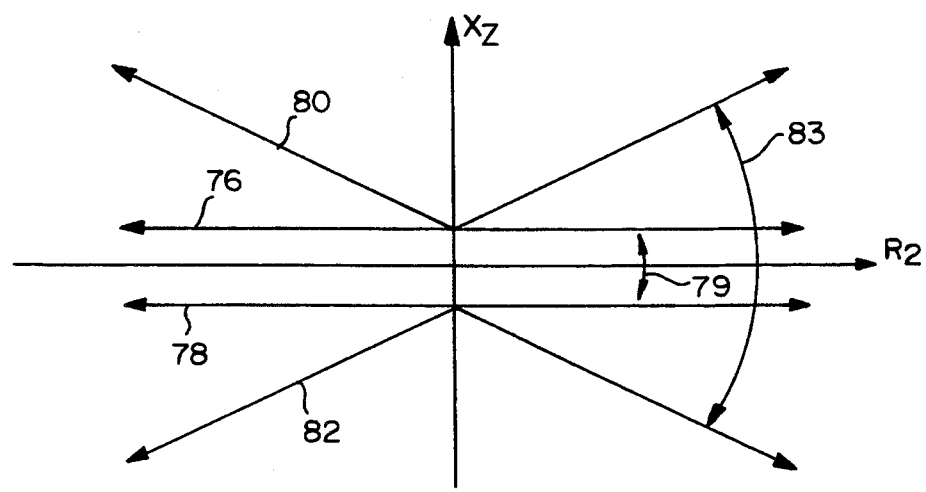
FIG. 4 is an impedance plane diagram showing the operation of a modified directional element circuit of the present invention.

In order to protect against this possible occurrence, the threshold test can be slightly modified. As discussed above, a scalar numeral $z_2$, which is a negative sequence impedance component at the angle of the reference impedance, is tested against selected thresholds for forward and reverse faults, respectively. Referring now to FIG. 4, an impedance plane is shown which includes the two straight line thresholds $Z_{2F}$ and $Z_{2R}$. These are hereafter referred to as $Z_{2F}$ (original) and $Z_{2R}$ (original) and are the basic threshold quantities for the embodiment discussed above. As discussed above, faults which are above the upper threshold line 76 ($Z_{2R}$ original) are reverse, while faults below the lower threshold line 78 ($Z_{2F}$ original) are forward. Because the two lines 76 and 78 are relatively close, usually separated by about 0.1 ohm, the value of the negative sequence impedance will typically not be in the space or band 79 between the two threshold lines.

This particular alternative embodiment includes a first threshold referred to as $Z_{2F}$ (modified), and a second threshold $Z_{2R}$ (modified). The modified thresholds include a fraction of the magnitude of the actual negative sequence impedance $Z_2$, determined by dividing the magnitude of the negative sequence voltage ($V_2$) by the magnitude of the negative sequence current ($I_2$). The comparison is made as follows: For a reliable indication of a reverse fault, while also protecting against three-phase transients, the modified threshold of $z_2$ for a reverse fault is $0.75Z_{2R}$ plus $0.25Z_2$ when $Z_{2R}$ is greater than or equal to zero and $1.25Z_{2R}$ plus $0.25Z_2$ when $Z_{2R}$ is less than zero. For a forward fault, the modified threshold is $0.75Z_{2F}$ minus $0.25Z_2$ where $Z_{2F}$ is greater than or equal to zero and $1.25Z_{2F}$ minus $0.25Z_2$, where $Z_{2F}$ is less than zero. As with the first embodiment, $z_2$ must be greater than the $Z_{2R}$ (modified) threshold to indicate a reverse fault and less than the $Z_{2F}$ (modified) threshold to indicate a forward fault.

The modified thresholds are shallow V-shapes as shown in FIG. 4, with the modified reverse threshold, line 80, being a V, while the modified forward threshold, line 82, is an inverse V. The band between the two thresholds thus increases along the resistance axis. These new thresholds operate to protect against three-phase transients, since it was discovered that such transients produced values of $z_2$ at a certain angle relative to the resistance axis. A large-enough fraction of the magnitude of the negative sequence impedance was selected to give each modified threshold a sufficient angle, relative to the resistance axis, that the three-phase transient $z_2$ values are located within band 83. Since the three-phase transients $z_2$ values are located within band 83, no output of the gates 32QF or 32QR is produced by the existence of three-phase transients.

Hence, a directional element for protective relays has been disclosed which uses negative sequence quantities for calculation of a scalar quantity which is related to the negative sequence impedance. The scalar quantity is compared against two selected thresholds to determine whether it is a reverse or forward fault. The apparatus may be used to determine just forward or reverse faults, by using only one threshold/comparison, or may be used to distinguish between forward and reverse faults and identify both.

Although a preferred embodiment of the invention has been disclosed for illustration, it should be understood that various changes, modifications and substitutions may be incorporated in such embodiment without departing from the spirit of the invention which is defined by the claims which follow:

What is claimed is:

1. A directional element for use in a relay for protection of power transmission lines, comprising:
   means for obtaining negative sequence voltage and current quantities of the power signal present on a power transmission line;
   means for calculating from said negative sequence voltage and current quantities a quantity which is representative of the negative sequence impedance of the transmission line; and
   means for comparing said calculated quantity against first and second selected comparison threshold quantities to identify direction of a fault relative to the relay, the first comparison threshold quantity being for a forward fault and the second comparison threshold quantity being for a reverse fault, and wherein said comparison threshold quantities include at least a portion of a predetermined basic threshold quantity and a selected fraction of the magnitude of the negative sequence impedance determined from the magnitudes of said negative sequence voltage and current quantities.

2. An apparatus of claim 1, including means for providing output indications of a forward fault and a reverse fault.

3. An apparatus of claim 2, wherein the first and second comparison threshold quantities are different from each other.

4. An apparatus of claim 2, wherein the first comparison threshold quantity comprises a first fraction of a first basic threshold quantity minus a first fraction of the magnitude of the negative sequence impedance when the first basic threshold quantity is not less than zero and comprises a second, larger fraction of the first basic threshold quantity minus said first fraction of the magnitude of the negative sequence impedance when the first basic threshold quantity is less than zero, and wherein the second comparison threshold quantity comprises a first fraction of a second basic threshold quantity plus a first fraction of the magnitude of the negative sequence impedance when the second basic threshold quantity is not less than zero, and comprises a second, larger fraction of the second basic threshold quantity plus the first fraction of the magnitude of the negative sequence impedance when the second basic threshold is less than zero.

5. An apparatus of claim 4, wherein the first fraction of the first and second basic threshold quantity is 0.75, the second fraction of the first and second basic threshold quantity is 1.25 and the first fraction of the magnitude of the negative sequence impedance is 0.25.

* * * * *